Sept. 29, 1936.  H. A. RICE  2,055,504
DISTRIBUTING APPARATUS
Filed Nov. 19, 1934  4 Sheets-Sheet 1
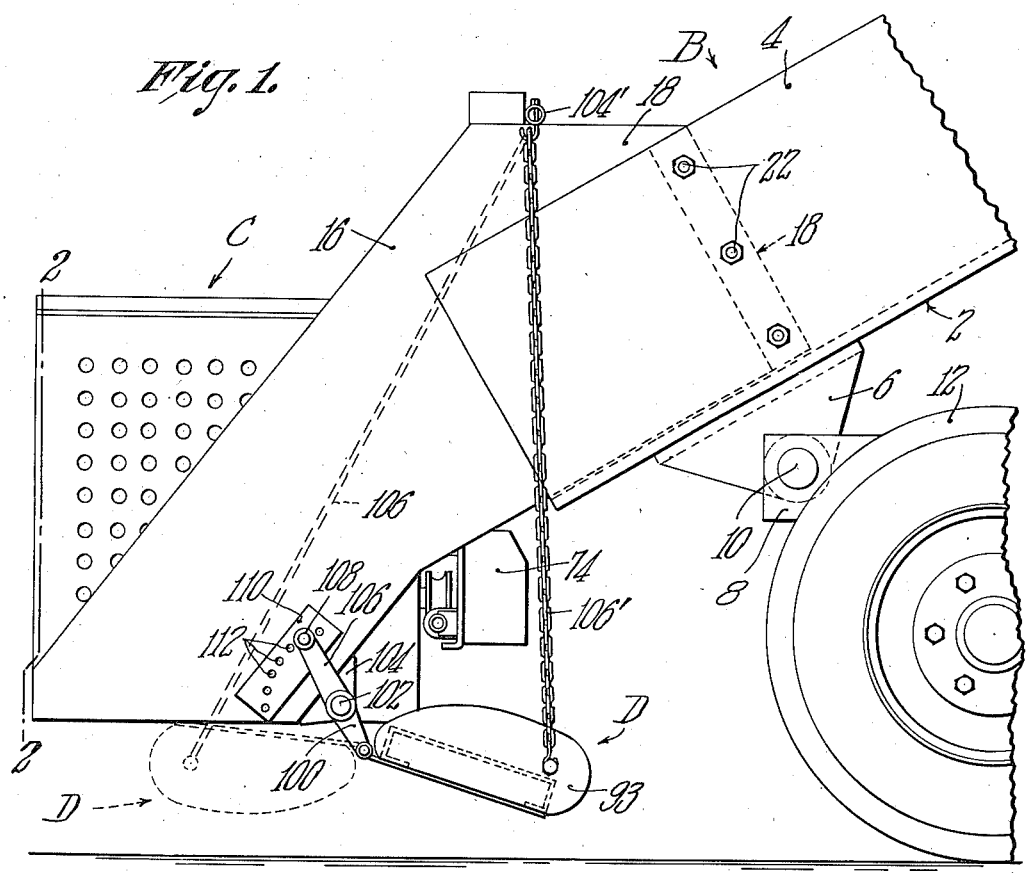
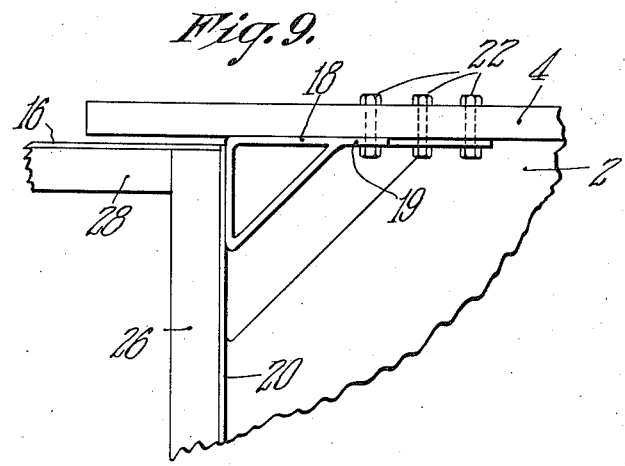
INVENTOR,
Harold A. Rice,
BY
ATTORNEY.

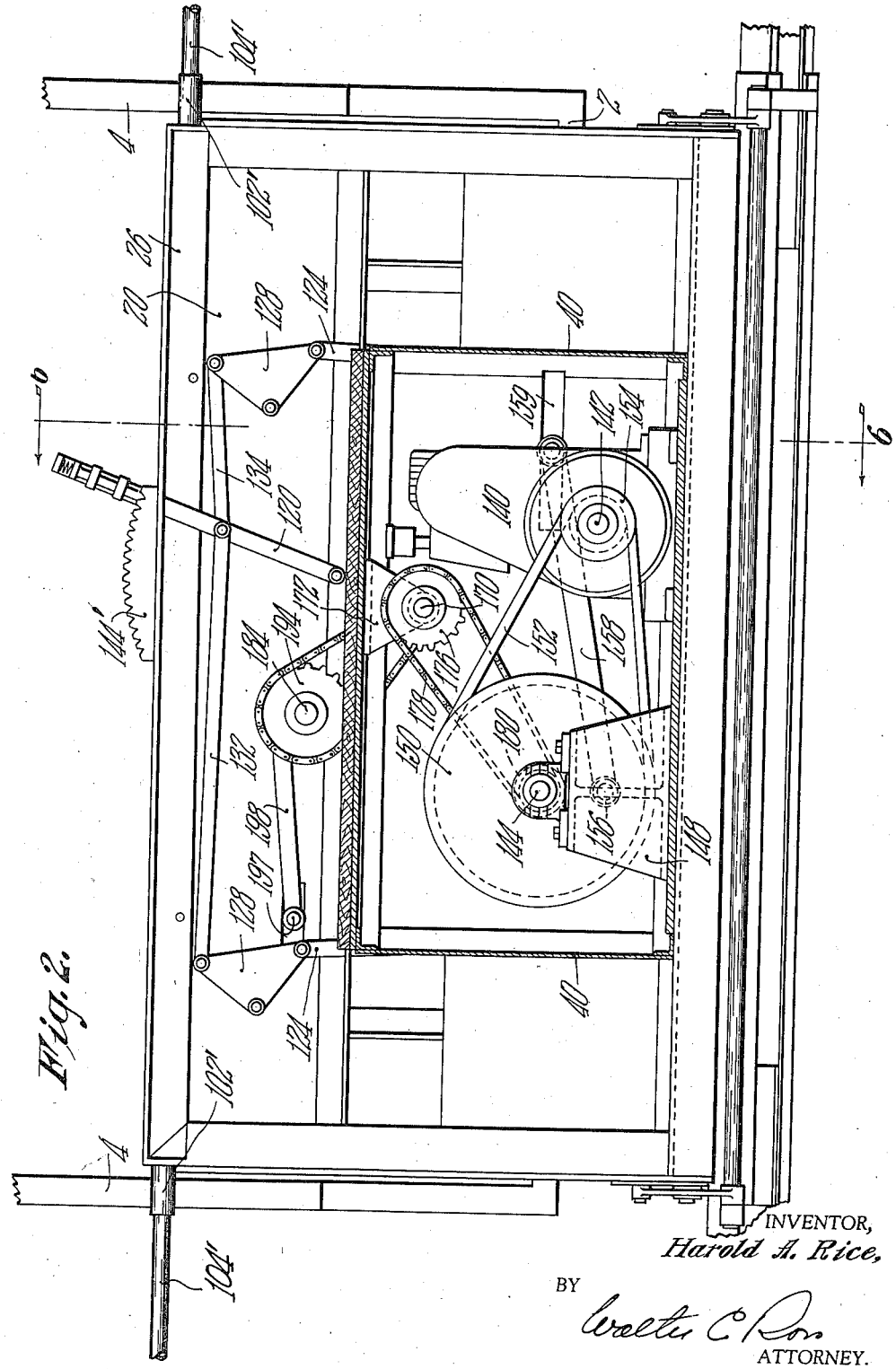

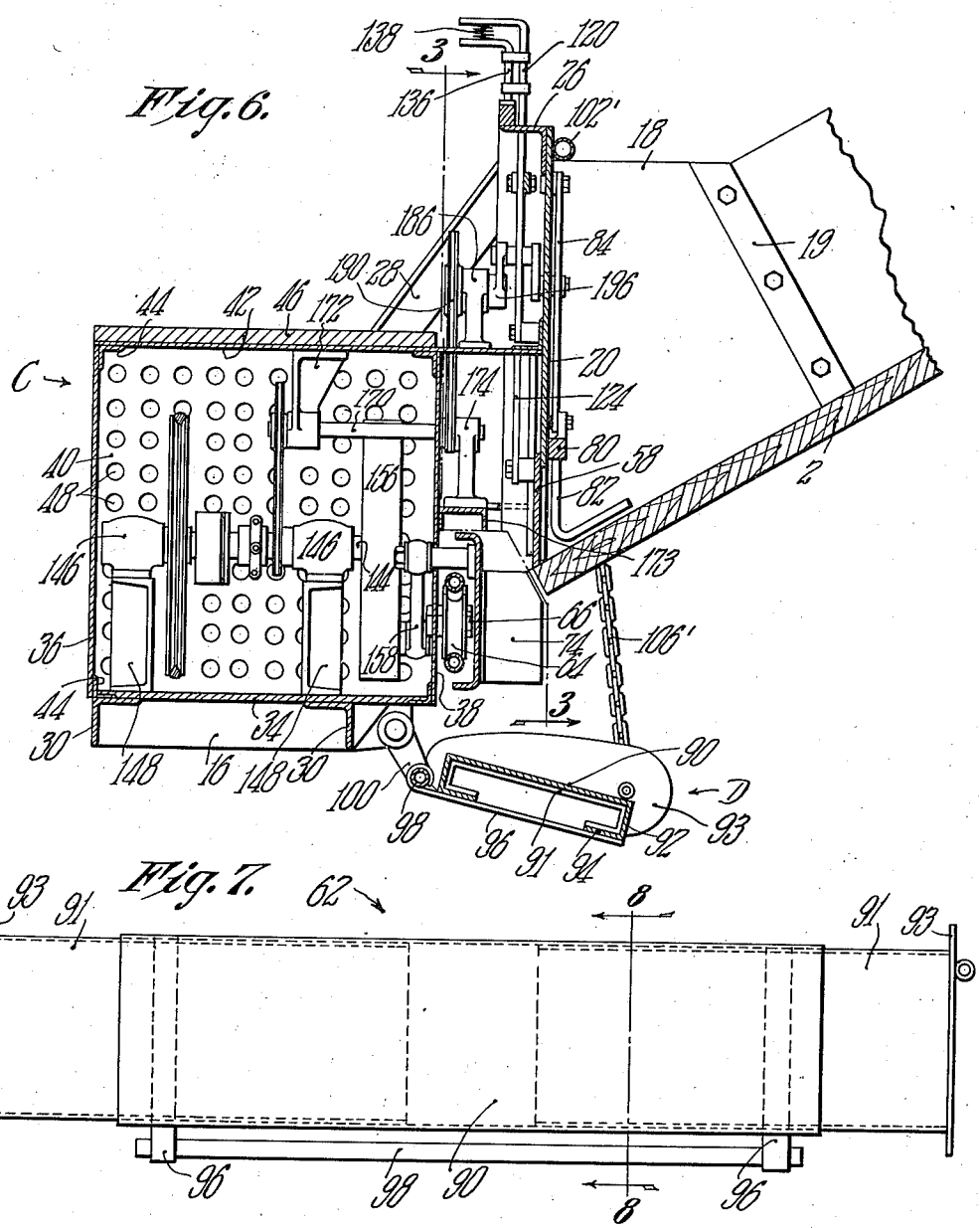

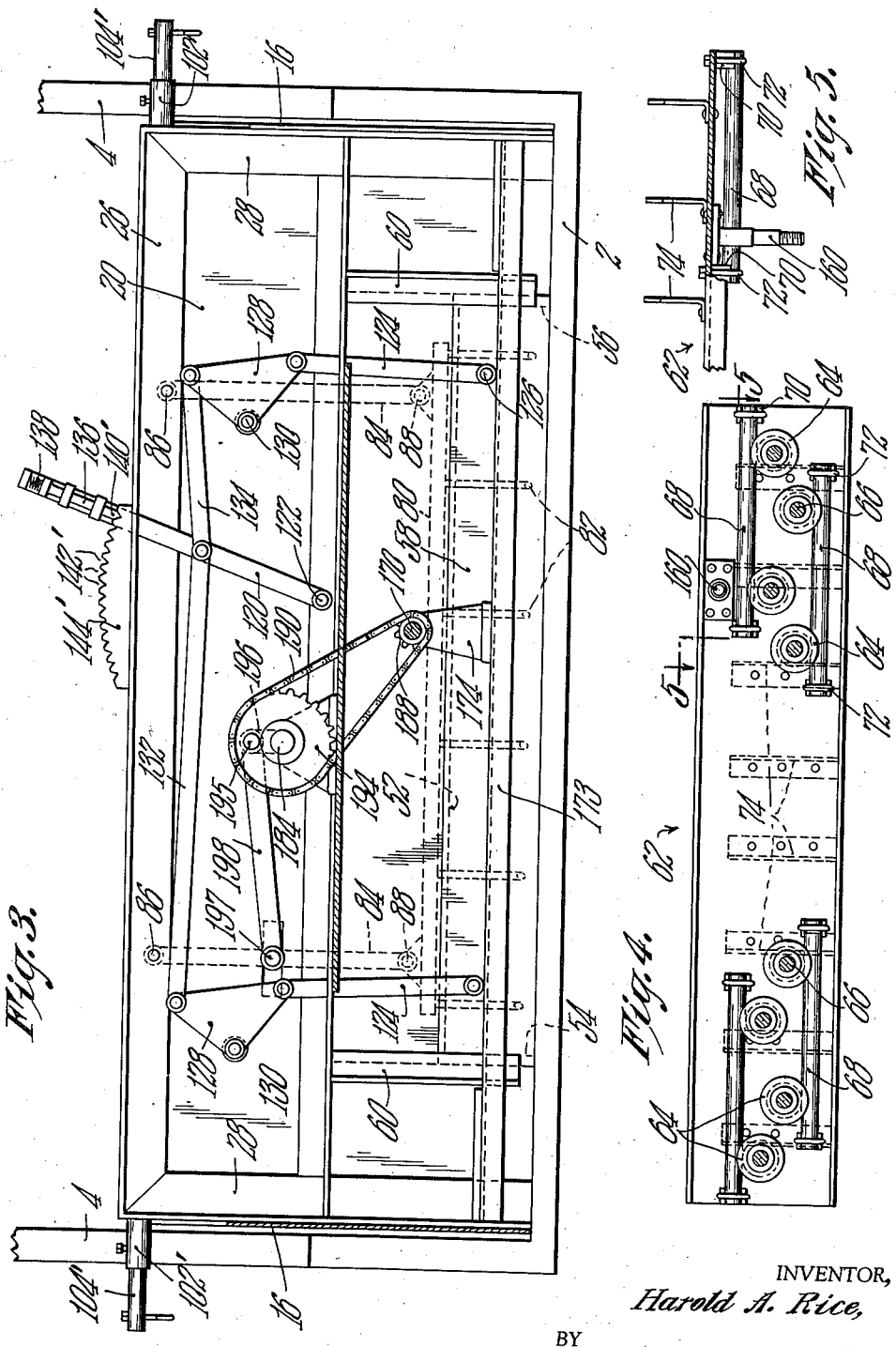

Patented Sept. 29, 1936

2,055,504

UNITED STATES PATENT OFFICE 2,055,504

DISTRIBUTING APPARATUS

Harold A. Rice, Ludlow, Mass.

Application November 19, 1934, Serial No. 753,581

30 Claims. (Cl. 275—2)

This invention relates to improvements in apparatus for distributing material and is directed more particularly to improvements in apparatus for distributing material from the body of an automobile dump-truck or the like so that material such as sand, trap-rock, and the like, carried by said body may be distributed over or along a roadway.

The principal objects of the invention are to provide a unitary apparatus which is adapted, constructed and arranged to be readily and easily secured to and removed from a dump body. As one special feature of the invention and as distinguished from the construction shown in United States Letters Patent No. 1,830,499, issued November 3rd, 1931, to Ransom Work, means is provided for distributing and agitating the material in the body which is operated independently of the truck, all to the end that the apparatus is entirely independent of the automobile truck. In this way it may be operated at various speeds for many and various purposes and, except for its use in connection with the body which contains the material for distributing or spreading, the apparatus is self-contained so as to be readily attached to any one of a number of bodies.

Many and various other novel features and advantages of the invention will be more fully hereinafter pointed out in connection with the accompanying description of the present preferred form of the invention, reference being had to the drawings wherein:

Fig. 1 is a side elevational view of the rear portion of an automobile truck showing how the unitary distributing apparatus of the invention may be attached to the body thereof;

Fig. 2 is a transverse sectional elevational view on the line 2—2 of Fig. 1;

Fig. 3 is a transverse sectional elevational view on the line 3—3 of Fig. 6;

Fig. 4 is a side elevational view of the shuttle, an important part of the apparatus of the invention;

Fig. 5 is a combined plan and sectional view on the line 5—5 of Fig. 4;

Fig. 6 is a sectional elevational view on the line 6—6 of Fig. 2;

Fig. 7 is a plan view of the distributor, another important part of the apparatus of the invention;

Fig. 8 is a sectional view on the line 8—8 of Fig. 7; and

Fig. 9 is a fragmentary plan view to show how the distributing apparatus is secured to a truck body.

Referring now to the drawings more in detail, the invention will be fully described.

In Fig. 1 there is shown the rearmost portion of a dump-truck. For purposes of disclosure, B represents the rear end part of the dump body which as usual has a lower wall 2 and side walls such as 4. As is common practise, the body B is arranged for tilting movements as by brackets such as 6 pivoted to the frame 8 at 10. One of the rear wheels of the dump-truck is represented at 12.

The apparatus of the invention is of a unitary and self-contained nature and is adapted to be associated with the rear end of the body B so that when the body is in a tilted relation, material therein such as sand, trap-rock and the like may be distributed by the apparatus. At the same time the apparatus is readily and easily attached to the body and may likewise be removed therefrom. The body B as shown in Fig. 1 is in a tilted position, in which position material in the body is distributed by the distributing apparatus of the invention.

A pair of side plates 16 are provided which have angle corner members 18 associated therewith and with a tail-board 20 which is in the form of a plate extending between the side members 16. The members 18 have inner sides which incline upwardly and inwardly from their lower edges, as shown more clearly in Figs. 6 and 9, so that when the body is in the tilted position shown, material therein is directed towards the centermost part of the tailboard 20.

Flanges 19 provided on the angle corner members 18, as shown in Fig. 9, have a plurality of openings therethrough to receive bolts 22 or the like which may extend through the side walls of the body. Preferably the corner angles constitute the sole means of connection between the distributing structure and the body B and not only do the angles direct the material in the body towards the centermost part of the tail-board but they serve to brace the distributing structure. An angle 26 extends along the top of the tail-board 20 and other angles 28 may be associated with the plates 16 to stiffen the same.

The angles and plates already described as well as those hereinafter described may be secured together in any suitable manner. Preferably, however, the parts are secured together as by welding to provide a strong rigid structure.

Forward and rear supporting members 30 extend between the side plates 16 and these may be in the form of angles. A compartment indicated generally by C is disposed over the members 30 and it has a floor 34, front and rear walls 36 and 38, end walls 40 and an upper wall 42. Preferably the parts constituting the compartment will be of metal secured together and reinforced by angles such as 44, shown in Fig. 6. There may be a member 46 associated with the upper wall 42 to serve as a platform for the operator of the apparatus to stand upon.

The compartment described encloses the driving mechanism for the apparatus as will appear. To provide ventilation for the compartment some of the walls such as the end walls 40 are perforated at 48, as shown in Fig. 6. Otherwise, some or all of the walls may be made from screen cloth or the like, all as may be desired.

As has been stated, the tail-board 20, corner angles 18, side plates 16, members 28 and 30 are suitably secured together to provide a strong rigid structure which functions as a supporting structure for the different units of the apparatus.

The tail-board 20 on its lower edge is cut away to provide an opening therethrough. With reference to Fig. 3, the tail-board is cut away at lines 52, 54 and 56 and a gate represented generally by 58 is slidable up and down in guides 60 at the ends of the opening. The member 58 may be held in various positions as will later appear to provide more or less space between its lower side and the bottom wall 2 of the body B to allow more or less material to flow through the opening in the tail-board 20.

A shuttle 62 is provided which in the form of the invention shown in Fig. 4 is a channel-shaped member. This shuttle is mounted on the supporting structure for reciprocation back and forth and is located so as to lie outside and adjacent the end of the lower wall 2 of the body when the apparatus is attached thereto.

A plurality of rollers 64 are mounted for rotation on studs 66 associated with the wall 38 of the compartment and rods are secured to one side of the shuttle by means of spacing blocks 70 and U-bolts 72. The rods are in rolling engagement with the rollers to facilitate free reciprocating movements of the shuttle back and forth. Plates 74 extend rearwardly from the shuttle and are arranged in spaced relation as shown. These are arranged to lie adjacent the rear end of the lower wall of the body B.

Agitating means is provided at the rear side of the tail-board 20 to agitate and loosen up the material so that it will not clog but will instead flow freely through the opening in the tail-board. The said agitator consists of the following. A bar 80 carries downwardly and inwardly extending fingers 82. Links 84 pivoted to the supporting structure at 86 have their lower ends pivoted to the bar as at 88.

A deflector or distributor D shown in detail in Figs. 7 and 8 is provided which consists of a main body part 90 having side walls 92 and lower walls 94. Tie members 96 are secured to the parts 94 which have associated therewith a trunnion 98 pivoted in levers 100. The said levers 100 are oscillatable on studs 102 associated with brackets 104 and they carry arms 106, as shown in Figs. 1 and 6.

Pins 108 are slidable in arms 106 and are engageable with a plurality of holes 112 of plates 110 associated with the side plates 16. There may be but one arm 106 and plate 110 if desired. End members 91 fit within the distributor and are slidable relative thereto. These members 91 carry on their extremities end plates such as 93.

A tubular member 102' is secured to the upper side of the tailboard 20 and extensions 104' are slidable therein. To these extensions there are connected chains 106' which have their lower ends connected to the plates 93. These chains provide means for supporting the outerside of the distributor while its inner side is supported by the levers 100. As shown in Fig. 6 the deflector is supported in such a position as to receive sand or other material from the shuttle.

By adjusting the length of the chains the side of the distributor adjacent the body may be raised or lowered. By swinging the lever 106 on its pivotal axis the pin 108 thereof may be engaged with various openings 110 of plate 112 so that the rear side of the deflector may be located in various positions. In this way the angularity of the distributor may be varied.

When not in use, the distributor may be swung to the dotted line position shown in Fig. 1 and may be supported in this position by the chain as shown by dotted lines.

The gate 58 is moved up and down by means of the following. An operating lever 120 is pivoted at 122. Links 124 at their lower ends are pivoted at 126 to the gate 8, and at their upper ends they are pivoted, as shown, to oscillatable members 128. The members 128 are pivoted at 130 for oscillation and are connected to links 132 and 134 which have their inner ends pivoted to the lever 120.

A latch member 136 is slidable in the lever 120 which is spring-pressed downwardly by a spring 138. This latch is arranged so that its lower end 140' may engage with notches 142' of a segment 144'. By swinging the lever 120 to the left from the position shown in Fig. 3, the members 128 are oscillated counterclockwise to effect raising of the gate 58 which may be elevated to various positions and provide a slot thereunder of various heights.

As a special feature of the invention, mechanism for driving the shuttle and agitating mechanisms is disposed within the compartment so that the apparatus is in the form of a unitary structure adapted to be secured to and removed from a truck body without the necessity of making connections to the wheels or other parts of the dump-truck. As a source of power, a motor 140 is provided which may take the form of an internal combustion engine or the like. This will have a driving shaft 142.

A main shaft 144 is rotatable in bearings 146 which are supported by blocks 148 and a driven member such as a wheel 150 on shaft 144 is operatively engaged by a belt or the like 152 passing over a driving member 154 of motor shaft 142. The wheel 150 associated with driven shaft 144 preferably functions as a flywheel and has a crank-pin 156 to which is pivotally connected a connecting rod 158. The outer end of the connecting rod 158 is pivoted on a stud 160 associated with the shuttle which is disposed to operate in a slot 159 of tail-board 20. As the shaft 144 is rotated, the shuttle is reciprocated back and forth to move the plates thereof back and forth behind and below the bottom wall of the body.

A shaft 170 is rotatable in bearings 172 and 174 and is driven by means of a sprocket 176 fixed thereto which is in engagement with the chain 178 passing over a sprocket 180 of shaft 144. A shaft 184 is rotatable in a bearing 186 and a sprocket 188 of shaft 170 has a chain 190 in engagement therewith which passes over a sprocket 194 of shaft 184. A crank 196 carries a crank-pin 195 on which is pivoted one end of a link 198, the other end of said link being pivoted at 197 to one of the levers 84.

As the shaft 184 is rotated by the mechanism described, the lever 84 is swung back and forth so as to move the member 80 back and forth and in that way the fingers 82 of the member 80 are caused to agitate the sand or other material within the body and behind the tail-board.

By providing the secured together plates, tail-board, angles and other parts described, there is provided a unitary supporting structure for the apparatus. The corner angles not only serve as the means for attaching the apparatus to the body but function to direct material inwardly of the body so that it flows through the opening in the tail-board.

With the apparatus attached to a body and with the body disposed in a tilted position, material such as sand, trap-rock, and the like flows toward the tail-board and through the opening therein which is variable in area by means of the gate. As material flows through the opening it is thrown back and forth by the shuttle plates to provide a uniform distribution of material.

The distributor is positioned at such an angle that material falls therefrom and, having the extensible end members which carry the end plates, it is possible to spread or distribute material over a predetermined width which may be varied by moving the end extensions of the distributor in and out.

The agitator loosens and frees up the material to facilitate a free flow thereof through the opening in the tail-board, all of which contributes to the uniformity of distribution of the material.

It will be noted that the apparatus is unitary in nature so that a self-contained unit is provided which is not only adapted for ready attachment to, and removal from, a dump body but the apparatus is operated from means associated therewith as distinguished from apparatus driven from the dump-truck. In this way when distributing material it is possible to operate the apparatus at any desired speed without regard to the speed at which the dump-truck is traversing the ground on which the material is being distributed.

By providing the self-contained unitary structure, it is possible to use the same with a plurality of dump-trucks, there being no driving connections between the dump-truck and apparatus and no special condition need to be met other than that the corner angles be receivable between the walls of the body.

As one special feature of the invention, the shuttle is so disposed that it is below and behind the lower wall of the dump body when the apparatus is attached thereto. This facilitates the free and easy reciprocation of the shuttle and is especially desired where particular conditions require high speed reciprocation of the shuttle.

The plates merely strike the material as it flows from the body so that no great effort is required in throwing the material in one direction or the other. This is to be distinguished from apparatus where moving parts operate in the material so as to make it necessary to overcome the weight and pressure thereof.

While I have described my invention in great detail and with respect to a preferred embodiment thereof, I do not desire to be limited to such detail or embodiment since many changes and modifications may be made without departing from the spirit and scope of the invention in its broader aspects. Hence, what I desire to claim as new and secure by Letters Patent of the United States is:

1. A unitary distributing apparatus adapted to be attached to the rear end of a truck body or the like comprising in combination, a supporting structure including a tail-board provided with an opening and corner angles at the ends thereof for securing to the side walls of a body, distributing means including a shuttle mounted for reciprocation on said structure having deflector plates extending rearwardly therefrom, and operating means carried by said structure to reciprocate said shuttle, all adapted and arranged whereby when the structure is associated with a body the plates of the shuttle are disposed outside and rearwardly of the bottom wall of the body to distribute material flowing from the body.

2. A unitary distributing apparatus adapted to be attached to the rear end of a truck body or the like comprising in combination, a supporting structure including a tail-board provided with an opening and corner angles at the ends thereof for securing to the walls of a body, distributing means including a shuttle member mounted for reciprocation on said structure having deflector plates extending rearwardly therefrom, operating means carried by said structure to reciprocate said shuttle, all adapted and arranged whereby when the structure is associated with the body, the plates of the shuttle are disposed outside and rearwardly of the bottom wall of the body to distribute material flowing from the body, and a distributor member on said structure adapted to lie below said shuttle.

3. A unitary distributing apparatus for attachment to the body of a truck or the like comprising in combination, a tail-board having an opening therein, a supporting structure associated therewith, corner angles associated with said tailboard at opposite ends thereof for attaching to the side walls of a body, a gate movable up and down over said opening of the tail-board, a shuttle having rearwardly extending plates mounted on said supporting structure for reciprocation back and forth and so disposed thereon that said plates are positioned rearwardly from the bottom wall of a body when the apparatus is attached thereto, operating means on said supporting structure and connections between said means and said shuttle.

4. A unitary distributing apparatus for attachment to the body of a truck or the like comprising in combination, a tail-board having an opening therein, a supporting structure associated therewith, corner angles associated with said tail-board at opposite ends thereof for attaching to the side walls of a body, a gate movable up and down over said opening of the tail-board, a shuttle having rearwardly extending plates mounted on said supporting structure for reciprocation back and forth so disposed thereon that said plates are positioned rearwardly from the bottom wall of a body when the apparatus is attached thereto, operating means on said supporting structure, connections between said means and shuttle, agitating means movably mounted on said structure for agitating material in a body behind said tailboard and connections between said operating means and said agitating means.

5. A unitary distributing apparatus comprising in combination, a tail-board having an opening therethrough, a gate movable over said opening, a shuttle reciprocable back and forth having spaced plates extending therefrom and disposed below the opening in the tail-board, a distributor mounted for swinging movements to underlie said shuttle, an operating unit, connections between said operating unit and said shuttle, and end members slidable on said distributor at opposite ends thereof.

6. The combination of the side and bottom walls of a dump body with a unitary distributing apparatus comprising in combination, a supporting structure including a tail-board extending between said side walls having an opening therethrough, a shuttle reciprocable on the structure rearwardly of said bottom wall having spaced plates extending towards said bottom wall, a driving unit on said supporting structure and driving connections between said unit and shuttle.

7. The combination of the side and bottom walls of a dump body with a unitary distributing apparatus comprising, a supporting structure including a tail-board extending between said side walls of the body and attaching means to attach the structure to said walls, the said tail-board being provided with an opening therethrough to permit material in the body to flow therefrom, a gate movably adjustable over said opening, a shuttle reciprocable on said supporting structure parallel to the end of said bottom wall having spaced plates extending therefrom out of contact with material in said body and disposed beyond the end of said bottom wall to engage material flowing through said opening and off the end of the bottom wall, a driving unit on said structure and connections between said unit and shuttle.

8. The combination of the side and bottom walls of a dump body with a unitary distributing apparatus comprising, a supporting structure including a tail-board extending between said side walls of the body and attaching means to attach the structure to said walls, the said tail-board being provided with an opening therethrough to permit material in the body to flow therefrom, a gate movably adjustable over said opening, a shuttle reciprocable on said supporting structure parallel to the end of said bottom wall having spaced plates extending therefrom out of contact with material in said body and disposed beyond the end of said bottom wall to engage material flowing through said opening and off the end of the bottom wall, a driving unit on said structure, connections between said unit and shuttle, an agitator movable on said structure to act on material in said body and connections therefrom to said driving unit.

9. The combination of the side and bottom walls of a dump body with a unitary distributing apparatus comprising, a supporting structure including a tail-board extending between said side walls of the body and attaching means to attach the structure to said walls, the said tail-board being provided with an opening therethrough to permit material in the body to flow therefrom, a gate movably adjustable over said opening, a shuttle reciprocable on said supporting structure parallel to the end of said bottom wall having spaced plates extending therefrom out of contact with material in said body and disposed beyond the end of said bottom wall to engage material flowing through said opening and off the end of the bottom wall, a driving unit on said structure, and connections between said unit and shuttle, the said attaching means including corner angles at the opposite ends of the tailboard abutting the side walls of the body.

10. A unitary distributing apparatus for attachment to a dump body comprising in combination, a tailboard having an opening therethrough, a gate movable over said opening, a shuttle reciprocable back and forth adjacent the opening in the tail-board, plates extending therefrom, a distributor mounted for swinging movements to underlie said shuttle, an operating unit, connections between said operating unit and said shuttle, an agitator movable adjacent said tailboard for agitating material in said body, connections between said unit and agitator, and end members slidable on said distributor at opposite ends thereof.

11. A unitary distributing apparatus for attaching to a dump body comprising in combination, a supporting structure including a tailboard for extending between the side walls of a body which is provided with an opening, a gate adjustable relative to said opening, a shuttle having plates extending therefrom disposed so the plates are located beyond the end of the bottom wall of a dump body when the apparatus is attached thereto, means associated with said structure and shuttle to facilitate free reciprocation of the shuttle in parallelism with the end of the bottom wall of the body, a driving unit on said supporting structure and connections between said unit and shuttle.

12. A unitary distributing apparatus adapted to be attached to the rear end of a truck body or the like comprising in combination, a supporting structure including a tail-board provided with an opening and securing means at the ends thereof for securing to the side walls of a body, distributing means including a shuttle mounted for reciprocation on said structure having deflector plates extending rearwardly therefrom, and operating means carried by said structure to reciprocate said shuttle, all adapted and arranged whereby when the structure is associated with a body the plates of the shuttle are disposed outside and rearwardly of the bottom wall of the body to distribute material flowing from the body.

13. A unitary distributing apparatus adapted to be attached to the rear end of a truck body or the like comprising in combination, a supporting structure including a tail-board provided with an opening and securing means at the ends thereof for securing to the walls of a body, distributing means including a shuttle member mounted for reciprocation on said structure having deflector plates extending rearwardly therefrom, operating means carried by said structure to reciprocate said shuttle, all adapted and arranged whereby when the structure is associated with a body, the plates of the shuttle are disposed outside and rearwardly of the bottom wall of the body to distribute material flowing from the body, and a distributor member on said structure adapted to lie below said shuttle.

14. The combination in a unitary distributing apparatus of, a tail-board having an opening therethrough and which is adapted to extend between the side walls of a dump body, a shuttle reciprocable back and forth adjacent the opening in the tail-board adapted to be disposed adjacent the bottom wall of a dump body having outwardly extending spaced plates; to throw material flowing through said opening, and a distributor having a receiving surface below said shuttle for receiving and distributing material falling thereonto from said opening and shuttle.

15. The combination in a unitary distributing apparatus of, a tail-board having an opening therethrough and which is adapted to extend between the side walls of a dump body, a shuttle reciprocable back and forth adjacent the opening in the tail-board adapted to be disposed adjacent the bottom wall of a dump body having outwardly extending spaced plates; to throw material flowing from said opening, a distributor having a receiving surface below said shuttle for receiving and distributing material from said shuttle and opening, and connections between said distributor and tail-board, the said connections facilitating swinging movements of the said distributor from a distributing position below said shuttle and a non-distributing position at a side thereof.

16. The combination in a unitary distributing apparatus of, a tail-board having an opening therethrough and which is adapted to extend between the side walls of a dump body, a shuttle reciprocable back and forth adjacent the opening in the tail-board adapted to be disposed adjacent the bottom wall of a dump body having outwardly extending spaced plates; to throw material flowing from said opening, a distributor having a receiving surface below said shuttle for receiving and distributing material from said shuttle and opening, and connections between said distributor and tail-board, the said connections facilitating swinging movements of said distributor to various angular positions below said shuttle, and means to hold said distributor in said various angular positions.

17. The combination in a unitary distributing apparatus of, a tail-board having an opening therethrough and which is adapted to extend between the side walls of a dump body, a shuttle reciprocable back and forth adjacent the opening in the tail-board adapted to be disposed adjacent the bottom wall of a dump body having outwardly extending spaced plates; to throw material flowing from said opening, a distributor having a receiving surface below said shuttle for receiving and distributing material from said shuttle and opening, connections between said distributor and tail-board, the said connections facilitating swinging movements of said distributor to various angular positions below said shuttle, means to hold said distributor in said various angular positions and the said distributor including end parts at opposite ends thereof which are movable in and out to vary the length of the said distributor.

18. The combination with the side and bottom walls of a dump body of a unitary distributing device comprising, a tail-board extending between said side walls having an opening therethrough, a supporting structure associated with the said tail-board, a shuttle having spaced plates extending therefrom reciprocably mounted on the supporting structure and disposed below and rearwardly of the said bottom wall, an agitator forwardly of said tail-board mounted for movements relative thereto, a driving unit on said supporting structure, driving connections between said driving unit and said shuttle and between said unit and said agitator, and a compartment for said driving unit.

19. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, and means associated with said supporting structure for engaging the walls of a body whereby the apparatus may be secured thereto.

20. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, a gate movable and adjustable on said supporting structure over the opening in said tail-board member, and means to operate said gate.

21. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, an agitator movable on said structure for agitating material in the body rearwardly of the tail-board member, and driving connections between said driving unit and agitator.

22. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, and a distributor extending substantially parallel to the path of movement of the shuttle and mounted on said supporting structure.

23. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, a distributor extending substantially parallel to the path of movement of the shuttle and mounted on said supporting structure, and parts movable in and out at opposite ends of said distributor to vary the length thereof.

24. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, and a distributor mounted for swinging movements on said supporting structure and adapted for positioning below said shuttle or at a position away therefrom.

25. The combination in a self-contained distributing apparatus adapted to be secured to the walls of a dump body or the like comprising, a tail-board member for extending between the walls of a body and forwardly disposed supporting members connected thereto providing a rigid supporting structure, the said tail-board provided with a discharge opening, a shuttle for acting on material discharged therethrough and mounted for back and forth movements in a horizontal plane on said supporting structure forwardly of the opening in the tail-board member having plates extending rearwardly towards said member, a self-contained driving unit on said structure, driving connections between said shuttle and driving unit, means associated with said supporting structure for engaging the walls of a body whereby the apparatus may be secured thereto, and means adjacent the ends of said tailboard and the rear side thereof which are inclined from their outer sides inwardly towards the central part of the tail-board to direct material towards the discharge opening thereof.

26. The combination in a self-contained distributing apparatus adapted to be secured to the walls of a dump body or the like comprising in combination, a supporting structure including a tailboard provided with a discharge opening, securing means for securing the same to the side walls of a body, distributing means including a shuttle mounted for reciprocation on said structure having spaced plates extending therefrom, and operating means carried by said structure operatively connected to said shuttle, all adapted and arranged whereby when the structure is associated with a body the plates of the shuttle are disposed outside and beyond the bottom wall of the body to distribute material flowing from the body.

27. The combination in a self-contained distributing apparatus adapted to be secured to the walls of a dump body or the like comprising in combination, a supporting structure including a tailboard provided with a discharge opening, securing means for securing the same to the side walls of a body, distributing means including a shuttle mounted for reciprocation on said structure having spaced plates extending therefrom, operating means carried by said structure operatively connected to said shuttle, and a distributor mounted on said supporting structure having a receiving surface below the shuttle for receiving material from said shuttle, all adapted and arranged whereby when the structure is associated with a body the plates of the shuttle are disposed outside and beyond the bottom wall of the body and the distributor is below said shuttle.

28. The combination in a self-contained distributing apparatus adapted to be secured to the walls of a dump body or the like comprising in combination, a supporting structure including a tailboard provided with a discharge opening, securing means for securing the same to the side walls of a body, distributing means including a shuttle mounted for reciprocation on said structure having spaced plates extending therefrom, operating means carried by said structure operatively connected to said shuttle, a distributor pivotally mounted for swinging movements below said shuttle towards and away from said shuttle and having a surface for receiving material from said shuttle, and means for holding said distributor in various positions, all adapted and arranged whereby when the structure is associated with a body the plates of the shuttle are disposed outside and beyond the bottom wall of the body to distribute material flowing from the body.

29. The combination in a self-contained distributing apparatus adapted to be secured to the walls of a dump body or the like comprising in combination, a unitary distributing apparatus adapted to be attached to the rear end of a dump body or the like comprising in combination, a supporting structure including a tail-board provided with an opening and securing means at the ends thereof for securing to the side walls of a body, means movable on said structure for engaging material flowing from said body through said opening, a distributor on said structure below said shuttle having a receiving surface for material, and extensions at the ends of said distributor movable in and out relative thereto whereby to vary the length thereof.

30. The combination in a self-contained distributing apparatus adapted to be secured to the walls of a dump body or the like comprising in combination, a supporting structure including a tail-board provided with an opening therethrough and securing means at the ends thereof for securing to the side walls of a body, a shuttle movable on said structure for engaging material flowing from said opening, and a distributor below said shuttle having a receiving surface and pivoted to said structure whereby said surface may be moved towards and away from said surface and assume various angles relative thereto.

HAROLD A. RICE.